(12) United States Patent
Chen et al.

(10) Patent No.: US 10,972,646 B2
(45) Date of Patent: Apr. 6, 2021

(54) CAMERA DEVICE AND MOBILE TERMINAL

(71) Applicant: TRIPLE WIN TECHNOLOGY(SHENZHEN) CO. LTD., Shenzhen (CN)

(72) Inventors: Shin-Wen Chen, New Taipei (TW);
Xiao-Mei Ma, Guangdong (CN);
Long-Fei Zhang, Guangdong (CN);
Kun Li, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/681,948

(22) Filed: Nov. 13, 2019

(65) Prior Publication Data

US 2021/0021746 A1 Jan. 21, 2021

(30) Foreign Application Priority Data

Jul. 17, 2019 (CN) .......................... 201910647565.1

(51) Int. Cl.
*H04N 5/225* (2006.01)
*H04N 5/247* (2006.01)

(52) U.S. Cl.
CPC ......... *H04N 5/2259* (2013.01); *H04N 5/2252* (2013.01); *H04N 5/2253* (2013.01); *H04N 5/2254* (2013.01); *H04N 5/2257* (2013.01); *H04N 5/247* (2013.01)

(58) Field of Classification Search
CPC .. H04N 5/2259; H04N 5/2252; H04N 5/2257; H04N 5/247; H04N 5/2254; H04N 5/2253
See application file for complete search history.

(56) References Cited

U.S. PATENT DOCUMENTS

| | | | |
|---|---|---|---|
| 8,368,808 B2 * | 2/2013 | Zhang | H04N 5/2251 348/376 |
| 9,507,241 B1 * | 11/2016 | Schantz | G03B 11/043 |
| 2010/0158500 A1 * | 6/2010 | Zhang | G03B 17/00 396/439 |
| 2014/0218587 A1 * | 8/2014 | Shah | H04N 17/002 348/340 |

FOREIGN PATENT DOCUMENTS

| | | |
|---|---|---|
| CN | 205320153 U | 6/2016 |
| CN | 207135186 U | 3/2018 |

* cited by examiner

*Primary Examiner* — Timothy J Henn
(74) *Attorney, Agent, or Firm* — ScienBiziP, P.C.

(57) ABSTRACT

A device with two cameras utilizing one photosensitive assembly includes a first camera assembly, a second camera assembly, and the photosensitive assembly. The first camera assembly and the second camera assembly are symmetrically positioned at both sides of the photosensitive assembly. The photosensitive assembly includes a driver and a connected photosensitive chip, the driver can drive the photosensitive chip to rotate, so that a photosensitive surface of the photosensitive chip is rotated between the first camera assembly and the second camera assembly. Therefore, the first camera assembly and the second camera assembly of the camera device are able to share one photosensitive chip, thereby the overall size and cost of the camera device is reduced. The present application also provides a mobile terminal having the camera device.

16 Claims, 10 Drawing Sheets

CAMERA DEVICE AND MOBILE TERMINAL

FIELD

The present disclosure relates to a camera device and a mobile terminal having the camera device.

BACKGROUND

Mobile phones often have two cameras, one is a front camera, and other is a rear camera. Usually, the two cameras are not used at the same time, but each camera includes an independent photosensitive chip, which may be expensive.

Thus, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

The present application will be described with reference to the accompanying drawings. A number of details are set forth in the following description so as to fully understand the present application. However, the present application can be implemented in many other ways different from those described herein, and those skilled in the art can make improvements without violating the contents of the present application. Therefore, the present application is not to be considered as limiting the scope of the embodiments described herein.

Unless otherwise defined, all technical and scientific terms used herein have the same meaning as commonly understood by one skilled in the art. The terms used in specification of the present application herein are only for describing specific embodiments, and are not intended to limit the present application.

Figure 1:
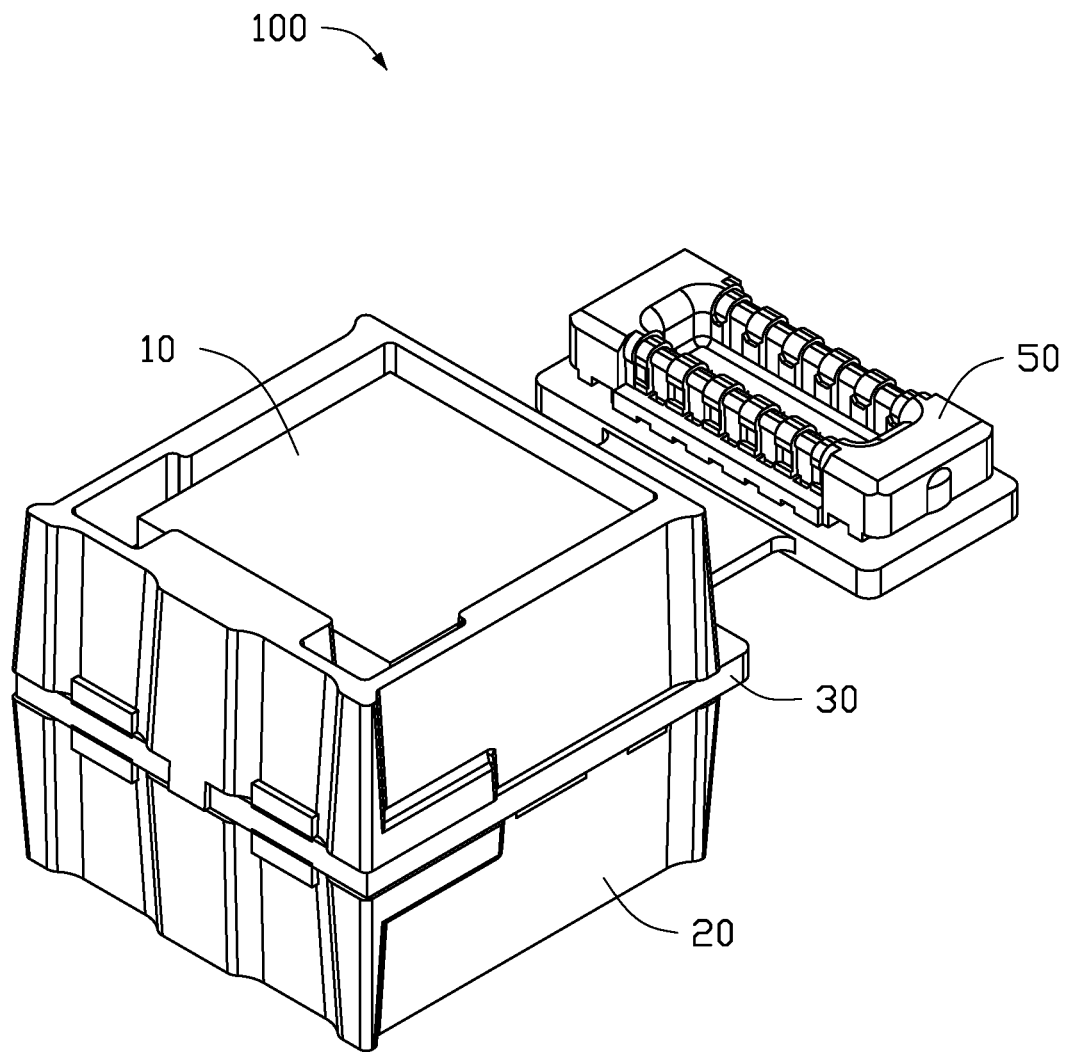
FIG. 1 is a schematic view of a camera device in an embodiment.
Figure 2:
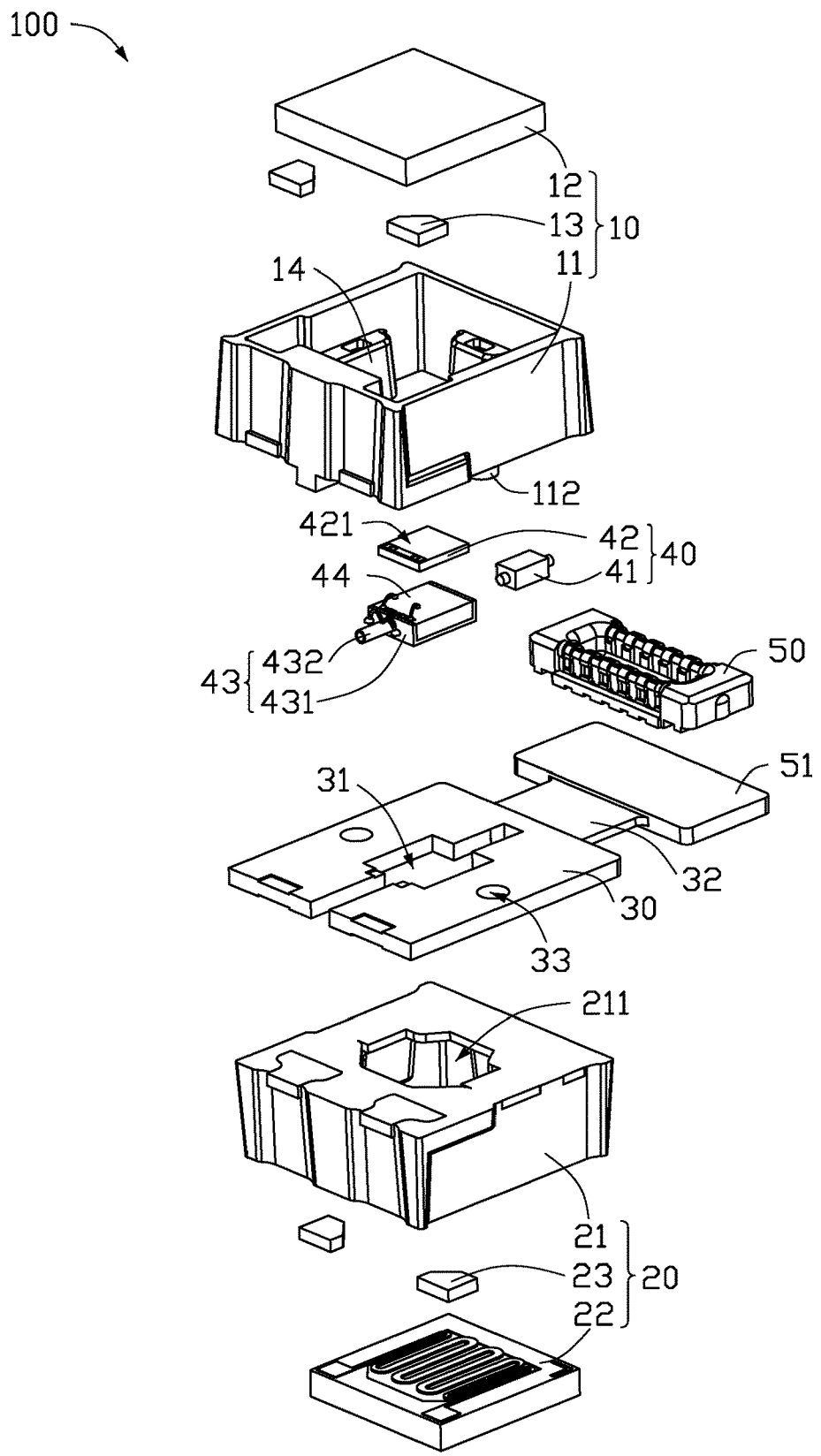
FIG. 2 is an exploded view of the camera device of FIG. 1.

Referring to FIG. 1 and FIG. 2, the camera device 100 includes a first camera assembly 10, a second camera assembly 20, and a photosensitive assembly 40. The first camera assembly 10 and the second camera assembly 20 are symmetrically positioned at both sides of the photosensitive assembly 40. The photosensitive assembly 40 includes a driver 41 and a photosensitive chip 42. The driver 41 drives the photosensitive chip 42 to rotate, so that a photosensitive surface 421 of the photosensitive chip 42 can be rotated between the first camera assembly 10 and the second camera assembly 20.

The camera device 100 further includes a first circuit board 30. A receiving groove 31 is defined on the first circuit board 30. Specifically, the receiving groove 31 is substantially defined in a middle portion of the first circuit board 30. The photosensitive assembly 40 is positioned in the receiving groove 31. The photosensitive chip 42 is electrically connected to the first circuit board 30. The first camera assembly 10 and the second camera assembly 20 are respectively positioned at two sides of the first circuit board 30.

The first camera assembly 10 includes a first housing 11, and the first housing 11 is positioned at a side of the first circuit board 30. A first through groove 111 is defined on a side of the first housing 11 facing the first circuit board 30, and the first through groove 111 corresponds to the receiving groove 31. The second camera assembly 20 includes a second housing 21, and the second housing 21 is positioned at another side of the first circuit board 30 which is opposite to the first housing 11. A second through groove 211 is defined on a side of the second housing 21 facing the first circuit board 30. The second through groove 211 corresponds to the receiving groove 31, so that the receiving groove 31, the first through groove 111, and the second through groove 211 are in communication. The photosensitive chip 42 is able to rotate in a space formed by the receiving groove 31, the first through groove 111, and the second through groove 211. In an embodiment, the first housing 11 and the second housing 21 may be respectively attached to opposite sides of the first circuit board 30 by adhesive glue. In other embodiments, the first housing 11 and the second housing 21 may be, but not limited to, fixed on the first circuit board 30 by soldering.

Figure 3:
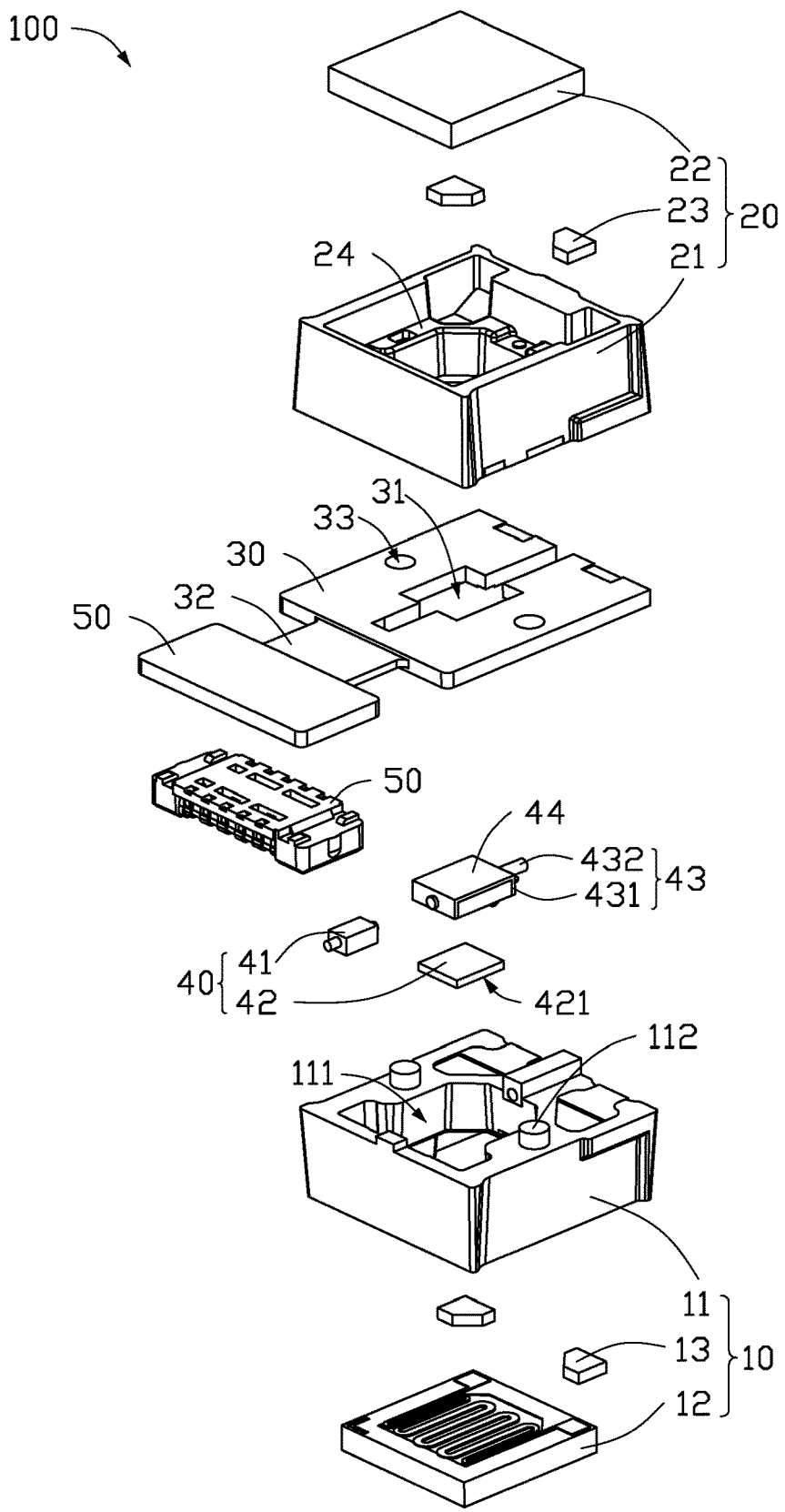
FIG. 3 is an exploded view of the camera device of FIG. 1 in another direction.

Referring to FIG. 2 and FIG. 3, two positioning holes 33 are defined on the first circuit board 30, and the two positioning holes 33 are symmetrically defined at sides of the receiving groove 31. Positioning portions 112 corresponding to the positioning holes 33 are positioned on the first housing 11. When the first housing 11 is arranged on the first circuit board 30, the positioning portions 112 are received in the positioning holes 33. The positioning portion 112 and the first housing 11 are integrally formed. In other embodiments, the number of the positioning holes 33 can be one or more than two.

The camera device 100 further includes an electrical connector 50 and a third circuit board 51. The electrical connector 50 is positioned on the third circuit board 51. The third circuit board 51 is electrically connected to the first circuit board 30 through a connecting member 32. The electrical connector 50 is electrically connected to the first circuit board 30 through the third circuit board 51. The electrical connector 50 is configured to connect the camera device 100 with a power source or a device. In an embodiment, the first circuit board 30, the connecting member 32, and the third circuit board 51 are integrally formed. The driver 41 of the photosensitive assembly 40 is electrically connected to the electrical connector 50 through the first circuit board 30 and the third circuit board 51, to obtain energy and signals for rotating the photosensitive chip 42.

The first camera assembly 10 further includes a first filter element 12. The first filter element 12 is positioned on a side of the first housing 11 opposite to the photosensitive chip 42, and the first filter element 12 is electrically connected to the first circuit board 30. The first filter element 12 is fixed on the first housing 11 through first adhesive members 13, and the first adhesive members 13 are, but not limited to, conductive adhesives. A plurality of first supporting portions 14 are positioned on the inner surfaces of the first housing 11 for supporting the first filter element 12, so that the first filter element 12 is spaced from the photosensitive assembly 40. Distance between the first filter element 12 and the photosensitive assembly 40 is configured for adjusting focusing of the first camera assembly.

The structure of the second camera assembly 20 is similar to that of the first camera assembly 10, and the second camera assembly 20 further includes a second filter element 22. The second filter element 22 is positioned on a side of the second housing 21 opposite to the photosensitive chip 42, and the second filter element 22 is electrically connected to the first circuit board 30. The second filter element 22 is fixed on the second housing 21 by second adhesive members 23. The second adhesive members 23 are, but are not limited to, conductive adhesives. A plurality of second supporting portions 24 are positioned on the inner surfaces of the second housing 21 for supporting the second filter element 22, so that the second filter element 22 is spaced from the photosensitive assembly 40. The first filter element 12 and the second filter element 22 cooperatively filter out light rays or light waves, such as infrared rays, which can interfere with the operation of the photosensitive chip 42.

Figure 4:
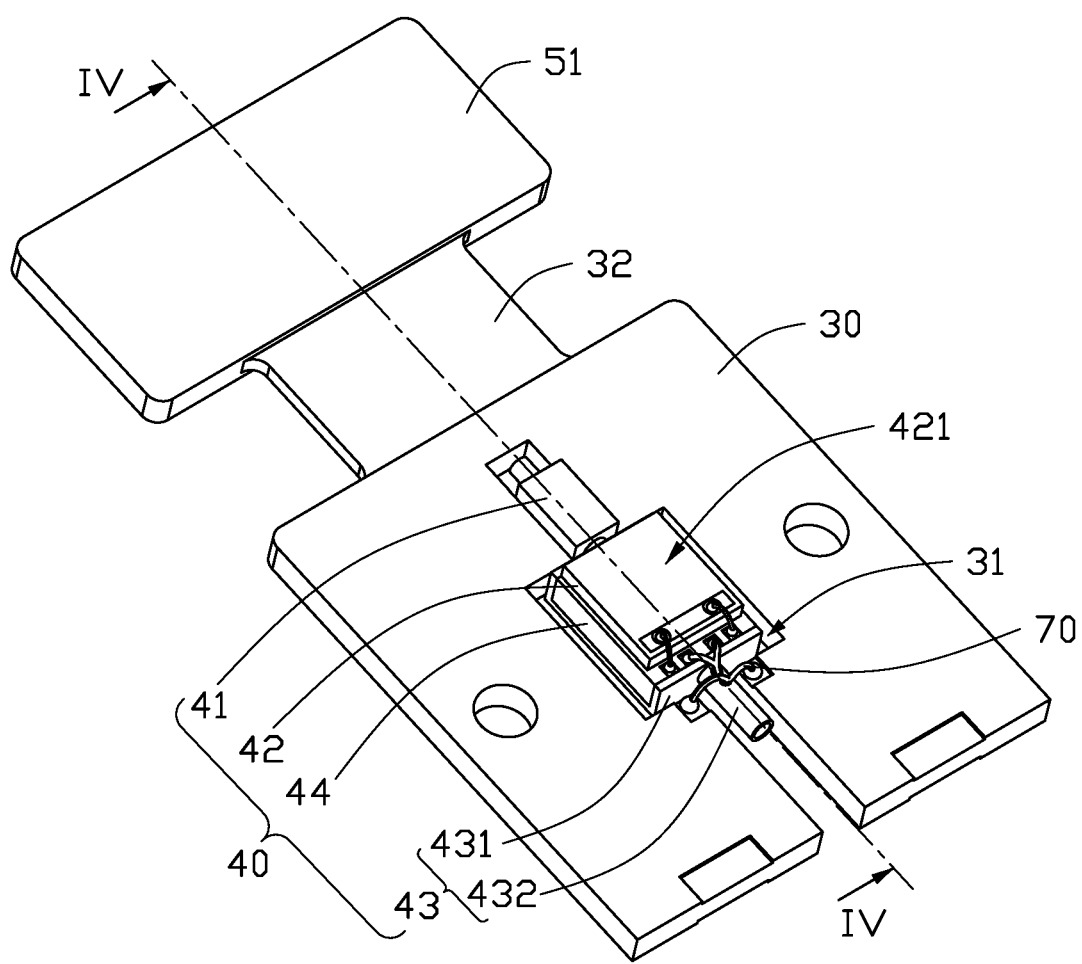
FIG. 4 is a schematic view of a photosensitive assembly of the camera device of FIG. 2.
Figure 5:
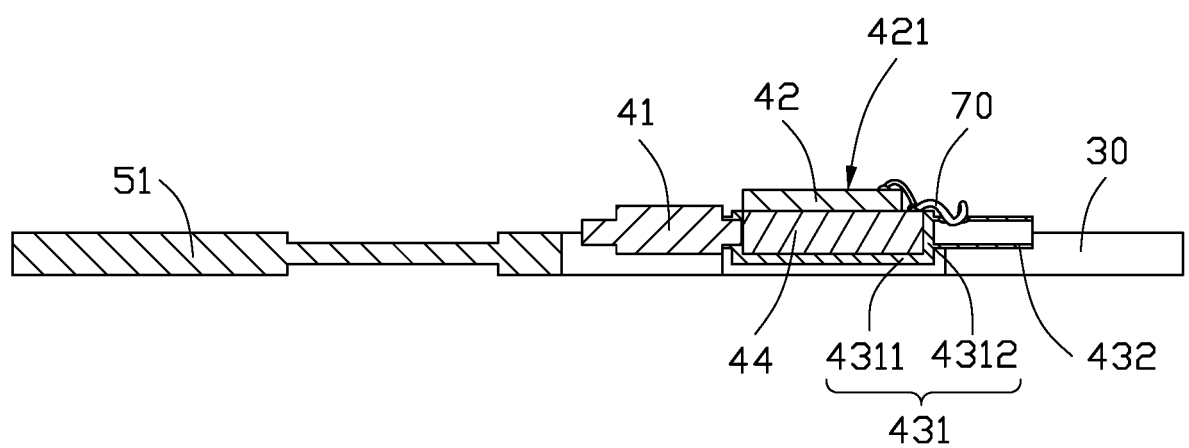
FIG. 5 is a cross sectional view along the direction IV-IV of FIG. 4.

Referring to FIGS. 2, 4 and 5, the photosensitive assembly 40 further includes a transmission component 43 and a second circuit board 44 positioned on the transmission component 43. The driver 41 drives the transmission component 43 to rotate. The photosensitive chip 42 is positioned on the surface of the second circuit board 44 and electrically connected to the second circuit board 44, so that the photosensitive chip 42 is able to be rotated with the transmission component 43. The transmission component 43 is positioned in the receiving groove 31, and the second circuit board 44 is electrically connected to the first circuit board 30 through the transmission component 43.

Specifically, the transmission component 43 includes a rotating member 431 and a mounting portion 432 fixedly coupled to the rotating member 431. The second circuit board 44 is positioned on the rotating member 431. The rotating member 431 includes a bottom plate 4311 and side walls 4312 positioned on opposite sides of the bottom plate 4311. The bottom plate 4311 and the side walls 4312 are integrally formed. The second circuit board 44 is positioned in a space formed by the bottom plate 4311 and the side walls 4312, and the photosensitive chip 42 is attached on a top surface of the second circuit board 44. One of the side walls 4312 of the rotating member 431 adjacent to the driver 41 is fixedly connected to a driving shaft of the driver 41. The mounting portion 432 is fixed on the other side wall 4312 of the rotating member 431. Two ends of the photosensitive assembly 40 are substantially positioned at the middle of the bottom side of the first housing 11, and the photosensitive assembly 40 crosses over the first through groove 111. The driver 41 is fixed at a side of the receiving groove 31. The mounting portion 432 is rotatably positioned in the receiving groove 31.

Figure 6:
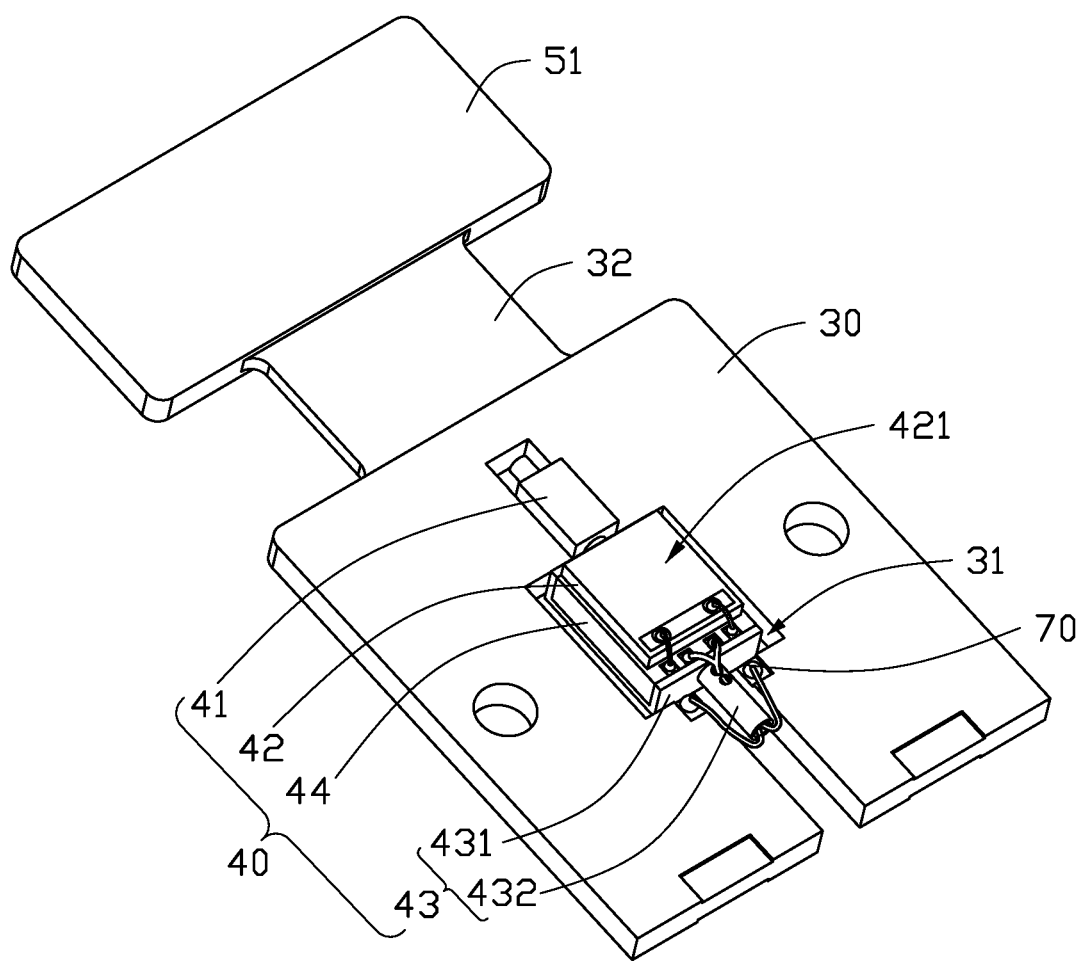
FIG. 6 is a schematic view of the photosensitive assembly of FIG. 4 in another embodiment.
Figure 7:
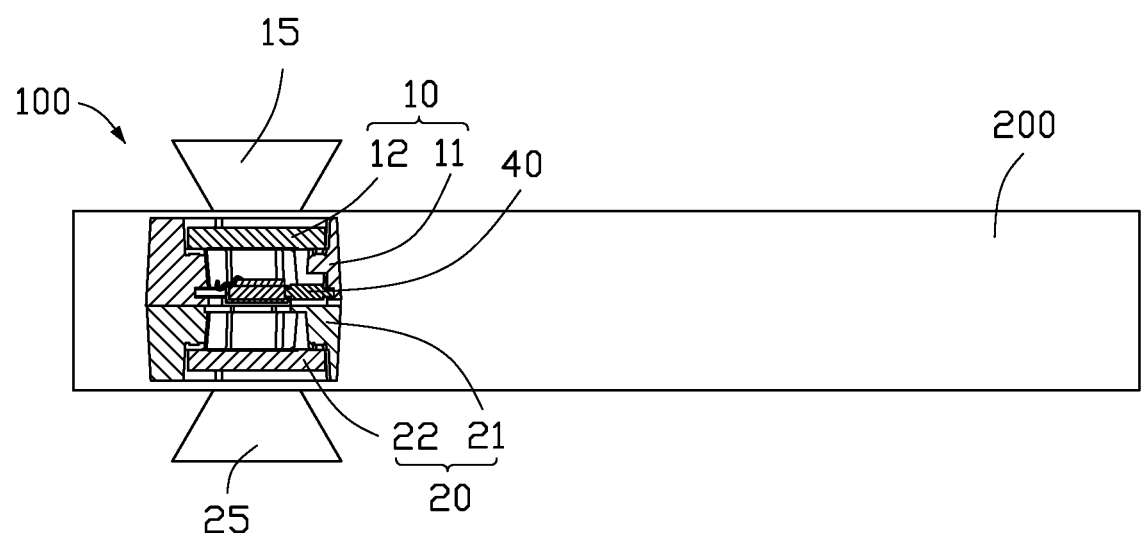
FIG. 7 is a schematic view of a mobile terminal in another embodiment, the mobile terminal having the camera device of FIG. 1.

The mounting portion 432 defines a hollow structure with open ends. Wires 70 for connecting the second circuit board 44 and the first circuit board 30 are received in and extended from the hollow structure of the mounting portion 432, to make the photosensitive chip 42 electrically connect the first circuit board 30 through the second circuit board 44. In an embodiment, Referring to FIG. 4, the wires 70 extend from through holes on a circumferential surface of the mounting portion 432, to make a connection between the first circuit board 30 and the second circuit board 44. The inner cavity of the mounting portion 432 stores wires 70 of sufficient length to allow slack during the rotation of the transmission component 43. In another embodiment, referring to FIG. 6, the wires 70 may extend from an opening end of the mounting portion 432, to make a connection between the first circuit board 30 and the second circuit board 44. Therefore, the wires 70 do not become entangled during the rotation of the transmission component 43.

Referring to FIGS. 7-10, a mobile terminal 200 includes a processor 60 and the camera device 100. The processor 60 is electrically connected to the camera device 100 through the electrical connector 50, so that the processor 60 is capable of controlling the photosensitive assembly 40 to rotate according to user command. The mobile terminal 200 may include, but is not limited to, a portable electronic device, a smart phone, and a tablet computer.

The camera device 100 further includes a first lens 15 and a second lens 25, which are respectively positioned on side surfaces of the mobile terminal 200. The first lens 15 corresponds to the first camera assembly 10, and the second lens 25 corresponds to the second camera assembly 20.

Figure 8:
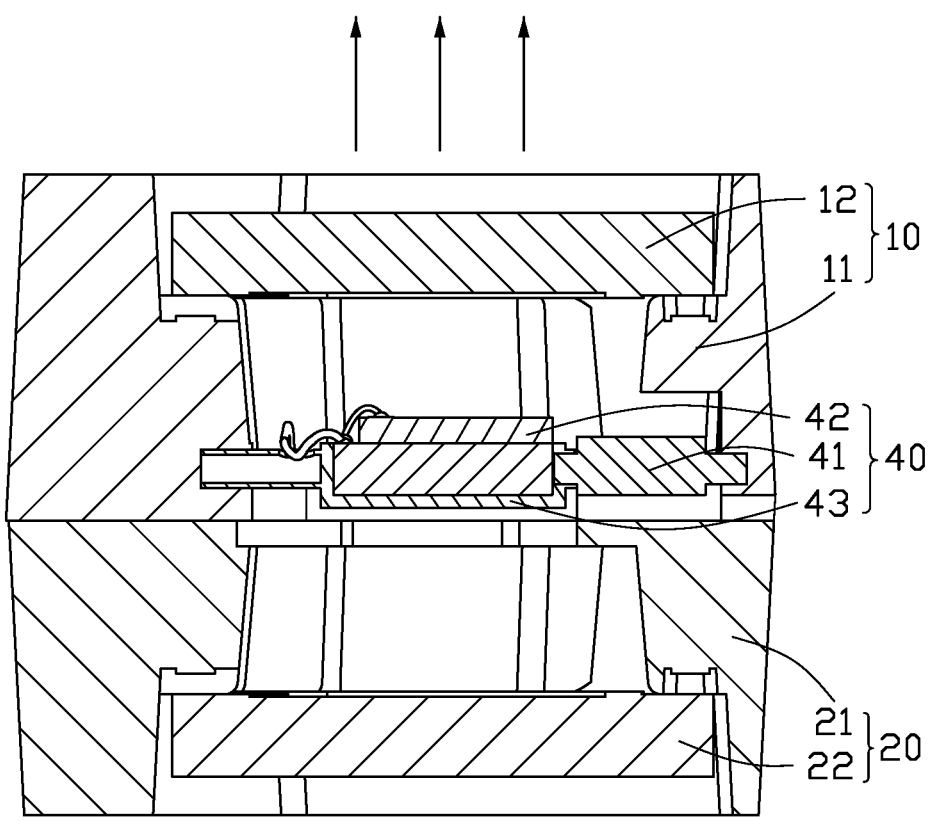
FIG. 8 is a schematic view of the photosensitive assembly of the camera device in the mobile terminal of FIG. 7, the photosensitive assembly is turned to a first camera assembly.

Referring to FIG. 8, when the user needs to use the first lens 15, the processor 60 sends a first signal to the camera device 100, and the driver 41 of the photosensitive assembly 40 drives the transmission component 43 to rotate according to the first signal, so that the photosensitive chip 42 is rotated toward the first camera assembly 10 until the photosensitive chip 42 faces the first filter element 12. The direction indicated by arrows in FIG. 8 is the photographing direction of the first camera assembly 10.

Figure 9:
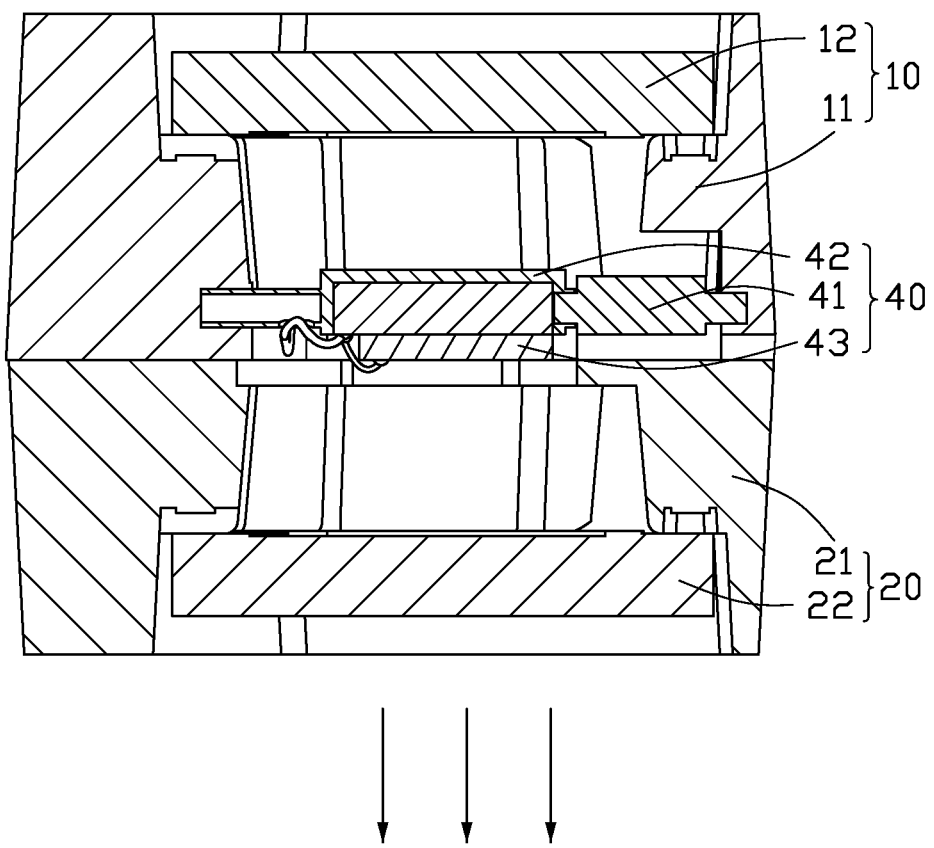
FIG. 9 is a schematic view of the photosensitive assembly of the camera device in the mobile terminal of FIG. 7, the photosensitive assembly is turned to a second camera assembly.
Figure 10:
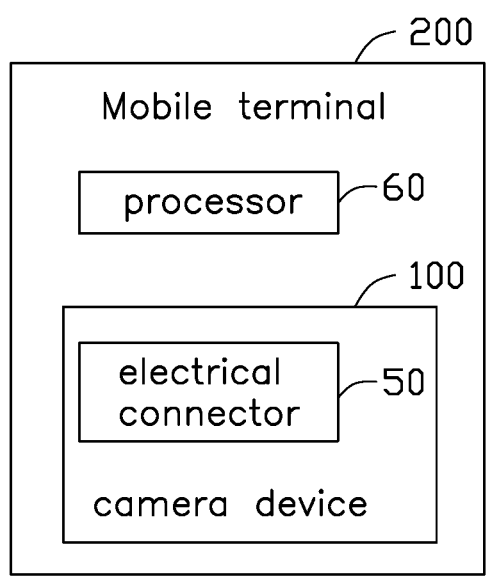
FIG. 10 is a block diagram of the mobile terminal of FIG. 7.

Referring to FIG. 9, when the user needs to use the second lens 25, the processor 60 sends a second signal to the camera device 100, and the driver 41 of the photosensitive assembly 40 drives the transmission component 43 to rotate according to the second signal, so that the photosensitive chip 42 is rotated toward the second camera assembly 20 until the photosensitive chip 42 faces the second filter element 22. The direction indicated by arrows in FIG. 9 is the photographing direction of the second camera assembly 20.

The first camera device 10 and the second camera device 20 of the camera device 100 and/or the mobile terminal 200 of the present application share one photosensitive chip 42 by rotating the photosensitive chip 42, thereby reducing the overall size of the camera device, and the construction cost of the camera device.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A camera device, comprising:
   a first camera assembly;
   a second camera assembly;
   a photosensitive assembly;
   a first circuit board;
   wherein the first camera assembly and the second camera assembly are symmetrically positioned at both sides of the photosensitive assembly;
   the photosensitive assembly comprises a driver and a photosensitive chip connected to the driver;
   the driver is configured to drive the photosensitive chip to rotate, a photosensitive surface of the photosensitive chip is rotated between the first camera assembly and the second camera assembly;
   a receiving groove is defined on the first circuit board to accommodate the photosensitive assembly, the photosensitive chip is electrically connected to the first circuit board, the first camera assembly and the second assembly are respectively positioned at sides of the first circuit board.

2. The camera device of claim 1, wherein the photosensitive assembly comprises a transmission component and a second circuit board, the second circuit board is fix on the transmission component, the transmission component is rotatable by the driver, the photosensitive chip is positioned on a surface of the transmission component and electrically connected to the second circuit board, the transmission component is positioned in the receiving groove, and the second circuit board electrically connects to the first circuit board through the transmission component.

3. The camera device of claim 2, wherein the transmission component comprises a rotating member and a mounting portion, the second circuit board is positioned on the rotating member, the mounting portion is fixed at an end of the rotating member away from the driver, the driver is fix in the receiving groove, the mounting portion and the rotating member are rotatable in the receiving groove.

4. The camera device of claim 3, wherein the rotating member comprises a bottom plate and side walls positioned on opposite sides of the bottom plate, the second circuit board is positioned in a space defined by the bottom plate and the side walls, and the photosensitive chip is attached on a top surface of the second circuit board.

5. The camera device of claim 3, wherein the mounting portion is a hollow structure, the hollow structure is configured to accommodate wires connecting the first circuit board and the second circuit board.

6. The camera device of claim 1, wherein the first camera assembly comprises a first housing, a first through groove is defined on a side of the first housing facing the first circuit board, the second camera assembly comprises a second housing, a second through groove is defined on a side of the second housing facing the first circuit board, the receiving groove communicates each of the first through groove and the second through groove, the photosensitive chip is rotatable in a space defined by the receiving groove, the first through groove, and the second through groove.

7. The camera device of claim 6, wherein the first camera assembly comprises a first filter element, the first filter element is positioned on a side of the first housing opposite to the photosensitive chip, and the first filter element electrically connects to the first circuit board.

8. The camera device of claim 7, wherein the first filter element is fixed on the first housing through a plurality of first adhesive members.

9. The camera device of claim 7, wherein the first filter element is spaced from the photosensitive assembly, a plurality of first supporting portions are positioned on inner surfaces of the first housing, the plurality of first supporting portion support the first filter element.

10. The camera device of claim 6, wherein the second camera assembly comprises a second filter element, the second filter element is positioned on a side of the second housing opposite to the photosensitive chip, and the second filter element electrically connects to the first circuit board.

11. The camera device of claim 10, wherein the second filter element is fixed on the second housing through a plurality of second adhesive members.

12. The camera device of claim 10, wherein the second filter element is spaced from the photosensitive assembly, a plurality of second supporting portions are positioned on inner surfaces of the second housing, the plurality of second supporting portions support the second filter element.

13. The camera device of claim 1, wherein the camera device comprises an electrical connector configured to connect to a power source or a device, the electrical connector is electrically connected to the first circuit board.

14. The camera device of claim 13, wherein the camera device comprises a third circuit board and a connecting member, the electrical connector is positioned on and electrically connected to the third circuit board, the connecting member is electrically connected between the third circuit board and the first circuit board.

15. A mobile terminal, comprising:
   a processor; and
   a camera device, connected to the processor;
   wherein the camera device comprises a first camera assembly, a second camera assembly, a photosensitive assembly, and a first circuit board;
   the first camera assembly and the second camera assembly are symmetrically positioned at both sides of the photosensitive assembly;
   the photosensitive assembly comprises a driver and a photosensitive chip connected to the driver;
   the driver is configured to drive the photosensitive chip to rotate, the photosensitive surface of the photosensitive chip is rotatable between the first camera assembly and the second camera assembly;
   a receiving groove is defined on the first circuit board to accommodate the photosensitive assembly, the photosensitive chip is electrically connected to the first circuit board, the first camera assembly and the second assembly are respectively positioned at sides of the first circuit board.

16. The mobile terminal of claim 15, wherein the camera device comprises a first lens and a second lens, the first lens and the second lens are respectively positioned on opposite side surfaces of the mobile terminal, the first lens corresponds to the first camera assembly, and the second lens corresponds to the second camera assembly.

* * * * *